United States Patent [19]

Pritchard

[11] 3,892,834

[45] July 1, 1975

[54] SURFACE ACTIVE AGENT TO REDUCE AGGLOMERATION IN DRY DIE-FACE PELLETIZING

[75] Inventor: James E. Pritchard, Bartlesville, Okla.

[73] Assignee: Phillips Petroleum Company, Bartlesville, Okla.

[22] Filed: Jan. 9, 1974

[21] Appl. No.: 431,858

[52] U.S. Cl. .................. 264/142; 264/8; 264/13; 264/237
[51] Int. Cl. ............................................. B29b 1/03
[58] Field of Search............ 264/8, 13, 6, 140–143, 264/237, 348

[56] References Cited
UNITED STATES PATENTS

| 2,923,033 | 2/1960 | Baldwin et al. | 264/13 |
| 3,103,700 | 9/1963 | Halverson et al. | 264/142 |
| 3,415,917 | 12/1968 | Watanabe et al. | 264/142 |

*Primary Examiner*—Jeffery R. Thurlow

[57] ABSTRACT

In a dry die-face pelletizing operation, wherein strands of polymer are extruded and cut into pellets at the die face using a rotary cutting means, the pellets are thrown out against an inner wall of a generally cylindrical housing where they contact a stream of water containing a surface active agent.

9 Claims, 3 Drawing Figures

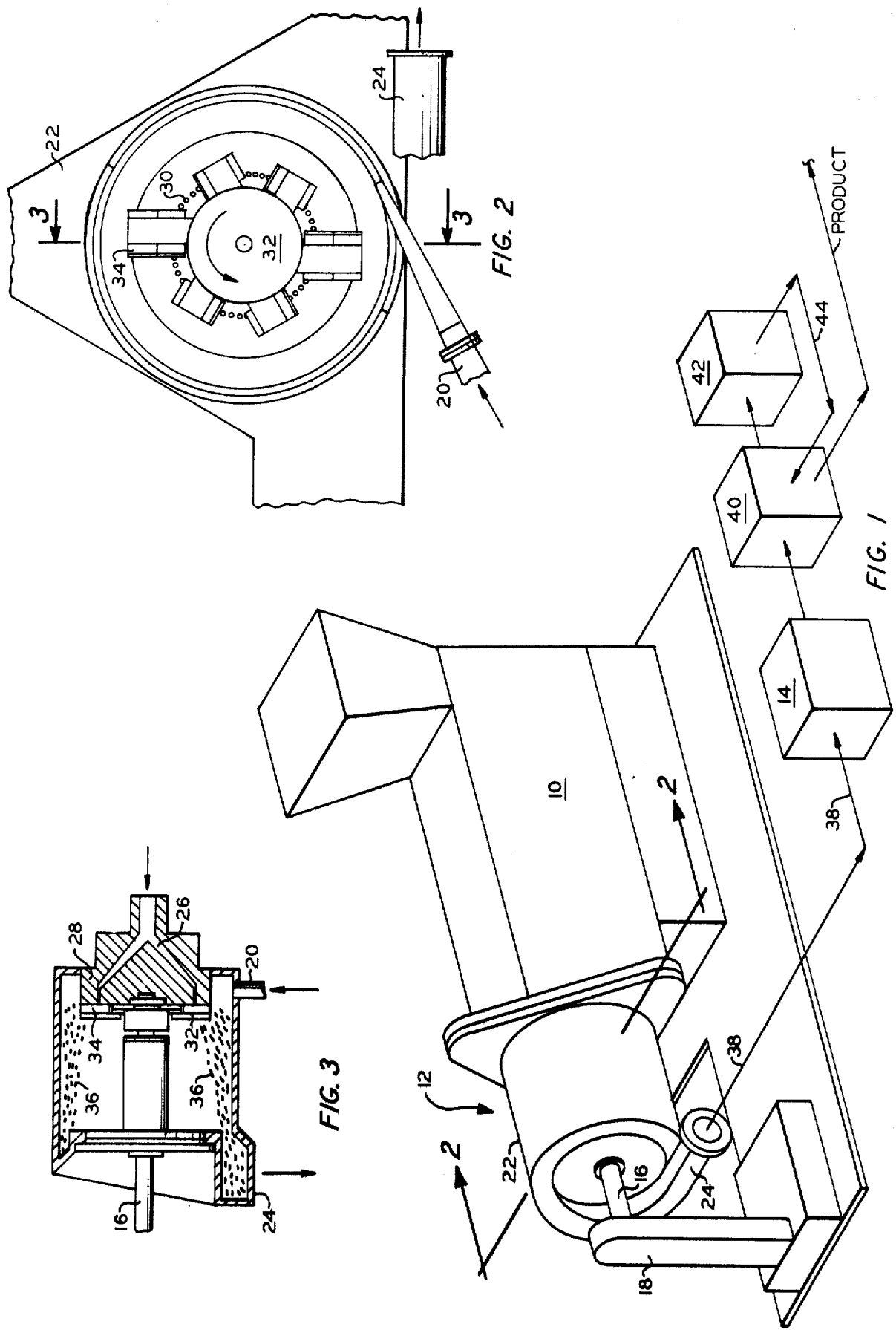

3,892,834

SURFACE ACTIVE AGENT TO REDUCE AGGLOMERATION IN DRY DIE-FACE PELLETIZING

BACKGROUND OF THE INVENTION

This invention relates to dry die-face pelletizing of polymeric materials.

In the commercial production of polymeric materials, particularly resinous thermoplastic materials such as polyolefins and the like, the polymer is converted into pellets prior to being packaged and shipped to the fabricator.

These pellets may be produced by extruding strands of polymer which are cooled and thereafter cut into short sections. Alternatively, the die can be submerged in water and the pellets cut immediately as they emerge from the die. This technique has the advantage of quickly cooling the pellets, but has the disadvantage of generating unacceptable amount of heat loss from the die itself. A third method of forming pellets is that of using a dry die-face cutter. In this technique a plurality of strands are extruded, generally in a circular configuration through a die, and a high speed rotary cutting unit severs the extrudate as it emerges from the die openings. The rotary action of the severing means throws the freshly cut molten pellets out against a generally cylindrical housing where they contact a cooling medium such as water. However, since the pellets are molten at the time they are severed and the die face is dry or at least essentially dry in that it is not submerged in water, there is a tendency for the pellets to stick together or agglomerate after they reach the water. This reduces the throughput which is particularly disadvantageous since extrusion equipment is relatively expensive and in order for a process to be economical, high throughput must be obtained.

Excessive agglomerate formation can plug off the discharge end of the pellet-water mixture leaving the housing of the pelletizer, can plug off entry to the dryer and can overload the dryer. Hence production is limited to an agglomerate level the system can tolerate by improving heat transfer of H₂O to pellet as in the invention, a decreased agglomerate level is achieved. This means throughput can be increased to the maximum agglomerate level tolerated by the system. Apparently large agglomerate masses in the housing can also interfere with the motion of the water thus reducing the benefit of rapidly moving water for cooling purposes and for moving the pellet mass to the dryer through the conveying trough. Reducing agglomerates can also reduce fines made with the agglomerate-breaker.

BRIEF SUMMARY OF THE INVENTION

It is an object of this invention to reduce agglomerates in a pelletizing operation; it is a further object of this invention to increase the throughput in a pelletizing operation; and it is yet a further object of this invention to provide a dry die-face pelletizing process which is free of the usual disadvantages associated therewith.

In accordance with this invention, water used for cooling freshly cut pellets in a dry die-face pelletizer contains a surface active agent.

BRIEF DESCRIPTION OF THE DRAWINGS

In the drawings, forming a part hereof, wherein like reference characters denote like parts in the various views, FIG. 1 is a schematic representation of an extruder utilizing a dry die-face cutter in accordance with the invention and a dryer downstream therefrom.

FIG. 2 is an end view of a dry die-face pelletizing apparatus taken along line 2—2 of FIG. 1; and FIG. 3 is essentially a section along line 3—3 of FIG. 2.

DESCRIPTION OF THE PREFERRED EMBODIMENTS

This invention is applicable to the production of pellets from any extrudable thermoplastic material. It is of particular utility in the production of pellets from normally solid polymers of at least one mono-1-olefin having 2 to 8 carbon atoms per molecule, more preferably ethylene, propylene and butene polymers and copolymers, most preferably polypropylene.

The invention is applicable to the production of pellets from any dry die-face cutter such as, for instance, that made by Werner and Pfleiderer. In such a pelletizing unit, a plurality of strands is extruded generally in a circular pattern or around a solid central portion of a circular pattern and severed flush with the die-face with a rotary cutting unit, generally a multibladed rotary knife. The cutting unit must rotate at a sufficient speed to force the freshly cut pellets out toward the periphery of a housing. Generally a rotor fitted with four or more knife blades is held against the die-face and rotates at a speed of 700 to 3,500 rpm. Of course some steam will be produced within the housing, but the term "dry die-face cutter" is meant to encompass units which are not submerged, but rather which throw the pellets radially or tangentially out against a cooling liquid.

The surface active agent can be present in any concentration from the lowest effective concentration up to a maximum dictated by economic considerations or the onset of excessive foaming. A concentration of 0.0025 to 0.35, preferably 0.01 to 0.03, most preferably 0.014 to 0.025 weight percent based on the weight of the water is preferred.

The purpose of the surface active agent is to reduce the surface tension of the water so that it will wet the pellets. Thus a lower concentration can be used than would generally be required to disperse a substance in water. Otherwise the freshly extruded molten pellets tend to form a separate phase rather than each pellet being surrounded by water. This is a particular problem with olefin polymers, the molten nascent surfaces of which are not easily wet by water. Thus the invention, by allowing each pellet to be surrounded by water, not only avoids agglomeration, but also greatly accelerates heat transfer. Otherwise the molten or near molten pellets are insufficiently cooled and stick together; accelerated heat transfer between pellet surface and cooling medium is important since it is difficult to remove heat from the pellet interior to pellet surface. Other additives such as antifoaming agents can be present in the water if desired.

The surface active agent essential to this invention can be any material generally referred to as a surface active agent including anionic, nonionic, cationic, and amphoteric materials.

The preferred surface active agents are anionic surface active agents, more preferably those anionic surface active agents generally referred to as wetting agents, more preferably sulfonates of the general formula $RSO_3M$ where $R$ is a $C_9$ to $C_{12}$ hydrocarbon group, and the cation, M, is sodium, potassium, or hydrogen. More preferred are naphthalene sulfonates of the general formula $RC_{10}H_6SO_3M$ wherein R is isopropyl, butyl, or nonyl and M is as defined above.

Other suitable anionic agents include carboxylates, aminocarboxylates, sulfates, or phosphates. Exemplary materials are R"COOM wherein R" is an alkyl group in the range of $C_9$ to $C_{21}$ and M is a metallic or amine ion. Exemplary materials are N-oleoylsarcosinate and sodium and potassium coco fatty acid soaps. Suitable sulfates are those represented by the formula $ROSO_3M$ wherein R is lauryl, 2-ethylhexyl, cetyl, oleyl, or octyl and M is Na, $NH_4$, K, diethanol amine, triethanol amine, or magnesium. Suitable phosphates include di-(2-ethylhexyl)phosphate, (2-ethylhexyl)$_5$, $Na_5(-P_3O_{10})_2$ and $(CH_3CH(C_2H_5)CH_2CH_2CH_2CH_2O)_2P(O)-(OCH_2CH_2)_nOH$.

Suitable nonionic surface active agents include the alkylphenoxypoly(ethyleneoxy)ethanols also referred to as ethoxylated alkylphenols such as that sold under the trademark Igepel CO 630 wherein the alkyl group is a nonyl group and the moles of ethylene oxide per mole nonylphenol are about 10.5.

Suitable cationic surfactants include those materials wherein the hydrophilic moieties are amino or quaternary nitrogens. One suitable class is compounds of the formula

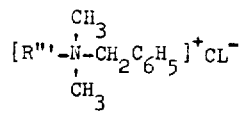

wherein R''' is tallow or cetyl.

Exemplary of amphoteric surfactants are those materials which contain both an acidic and a basic hydrophilic moiety in their structure such as N-hydroxyethyl-N-lauramido-beta-alanine, sodium salt.

Referring now to the drawings, there is shown in FIG. 1, a schematic representation of an extruder 10 fixed with a dry die-face cutter designated generally by reference character 12 and downstream therefrom dryer 14. The die-face cutter blade is rotated by means of shaft 16 driven by means 18. FIG. 2 is a section along lines 2—2 of FIG. 1. As can be seen, water enters tangentially via twin entry port 20 where it forms a rotating layer of water along the surface of a large housing 22 while moving axially downstream from the extruder. This water exits tangentially via line 24 carrying with it cool pellets. The polymer is extruded through channel 26 into die 28 (see FIG. 3) which has a plurality of orifices 30 arranged in a circular configuration concentric with said die. A rotary cutter 32 having a plurality of blades or knives 34 rotates as shown by the arrow to sever the extrudates as they emerge from orifices 30 at a point adjacent the face of said die 28. As can be seen, pellets 36 are thrown radially or tangentially outwardly toward the layer of water circulating adjacent an inner wall of housing 22. The resulting cooled pellets and agglomerates are then transferred via line 38 (FIG. 1) connecting exit line 24 and dryer 14. The dried mixture is passed over a shaker screen 40, the singles fall through and the agglomerates are passed to an agglomerate breaker 42 and recycled as necessary via line 44.

Many conventional parts such as temperature controllers, heaters, and the like have been omitted for the sake of simplicity, but their inclusion is understood by those skilled in the art.

As can be seen in the above described process the pellets are cooled and conveyed away in a fast flowing spiral stream of water although the die plate remains dry. The die of the pelletizer has rings of extrusion holes arranged concentrically. The rapid rotation of the knife ring throws the newly cut hot pellets tangentially against the inner wall of the large cylindrical hood which is constantly covered by a rotating layer of water which enters the hood at two separate points and moves axially away from the hot die-face and leaves the hood with the pellets in a tangential direction at the bottom. Thus each pellet has the same length of flight path through the air and also the same residence time in the water without pellets colliding with each other. The presence of the surface active agent reduces agglomerates as a result of the pellets touching after coming in contact with the water.

EXAMPLE

Polypropylene homopolymer was extruded from a ZSK twin screw compounding machine produced by Werner and Pfleiderer through a dry die-face cutter as shown in the Figures at a production rate of 4,140 pounds per hour. Water temperature to the pelletizer was 90°F. The mixer orifice temperature was 440°F., the extrudate melt temperature was 500°F and the screw rpm was 76. The speed of the four bladed pelletizer knife was 2,600 rpm. Two runs were made utilizing as additive, respectively 0.014 and 0.025 weight percent Nekal BA-77 (a product of GAF Corporation, New York, N.Y.) which is sodium isopropyl naphthalene sulfonate. Following results were obtained.

TABLE I

| Percentage of Pellets as* | Without Additive | | | 0.014 Wt. % Additive | | | | 0.025 Wt. % Additive | | | |
|---|---|---|---|---|---|---|---|---|---|---|---|
| | Count 1 | Count 2 | Avg. | Count 1 | Count 2 | Count 3 | Avg. | Count 1 | Count 2 | Count 3 | Avg. |
| Singles | 43.0 | 43.1 | 43.0 | 64.8 | 62.3 | 60.4 | 62.6 | 71.9 | 74.6 | 72.0 | 72.8 |
| Doubles | 21.3 | 24.5 | 22.9 | 18.6 | 19.9 | 18.0 | 18.8 | 16.4 | 14.8 | 15.1 | 15.4 |
| Triples | 13.7 | 13.8 | 13.9 | 8.6 | 8.1 | 9.1 | 8.6 | 5.1 | 6.4 | 6.3 | 5.9 |
| Quadruples | 9.4 | 6.6 | 8.0 | 3.5 | 4.5 | 5.3 | 4.4 | 2.2 | 2.9 | 4.2 | 3.1 |
| Larger | 12.6 | 12.0 | 12.3 | 4.5 | 5.2 | 7.2 | 5.6 | 4.4 | 1.3 | 2.3 | 2.7 |
| Total agglomerates | 57.0 | 56.9 | 57.0 | 35.2 | 37.6 | 39.6 | 37.4 | 28.1 | 25.4 | 27.9 | 27.1 |

*Agglomerate count based on samples obtained from the pelleted feed going to the agglomerate breaker - sample procedure identical for each test.

As can be seen from this data the surface active agent reduced the agglomerates and increased the weight percent of single pellets produced. In addition, it reduced the odor of the resulting pellets. Since Nekal BA-77 is a material which has FDA indirect food additive approval in the category of adhesives, the results were doubly important in that not only are agglomerates reduced which would be of benefit in all instances, but also the odor is improved which is of importance in applications involving food packaging and the like.

While this invention has been described in detail for the purpose of illustration, it is not to be construed as limited thereby but is intended to cover all changes and modifications within the spirit and scope thereof.

What is claimed is:

1. In a process for producing pellets from normally solid polymer of at least one mono-1-olefin having 2 to 8 carbon atoms per molecule, wherein said polymer is heated to a molten condition, extruded through a plurality of orifices in a die having a dry die-face, severed adjacent said die-face to produce said pellets, said pellets thereafter being thrown out toward an inner surface of a housing where they contact a stream of water moving around said inner surface and axially away from said die face, the improvement comprising incorporating 0.0025 to 0.35 weight percent based on the weight of said water of a surface active agent into said water to reduce agglomeration of said pellets.

2. A method according to claim 1 wherein said surface active agent is incorporated in an amount within the range of 0.01 to 0.03 weight percent based on the weight of said water.

3. A method according to claim 1 wherein said surface active agent is an anionic surface active agent which is a strong wetting agent.

4. A method according to claim 1 wherein said polymer is polypropylene.

5. A method according to claim 1 wherein said pellets are severed and thrown out against said inner surface by means of a multibladed knife rotating at a speed within the range of 700 to 3,500 rpm.

6. A method according to claim 1 wherein said water enters said housing tangentially from a plurality of points at an upstream end of said housing and exits tangentially with said pellets at a downstream end of said housing.

7. A method according to claim 1 wherein said polymer is extruded through a plurality of orifices arranged in a circle concentric with said die-face.

8. A method according to claim 1 wherein said surface active agent is sodium isopropyl naphthalene sulfonate.

9. A method according to claim 8 wherein said surface active agent is present in an amount within the range of 0.014 to 0.025 weight percent based on the weight of said water, said polymer is severed by means of a multi-bladed knife rotating at a speed within the range of 700 to 3,500 rpm, said water enters tangentially at a forward end of said housing and exits tangentially from a downstream end of said housing carrying with it said pellets, said polymer is extruded through a plurality of orifices arranged in a circle concentric with said die-face, said surface active agent is sodium isopropyl naphthalene sulfonate, and said polymer is polypropylene.

* * * * *